Dec. 14, 1948. T. C. FIFE 2,455,988
WATER HEATER
Filed Dec. 14, 1945 2 Sheets-Sheet 1

INVENTOR:
TRUESDELL C. FIFE,
BY
ATTORNEYS.

Dec. 14, 1948.          T. C. FIFE                 2,455,988
                      WATER HEATER
Filed Dec. 14, 1945                          2 Sheets-Sheet 2
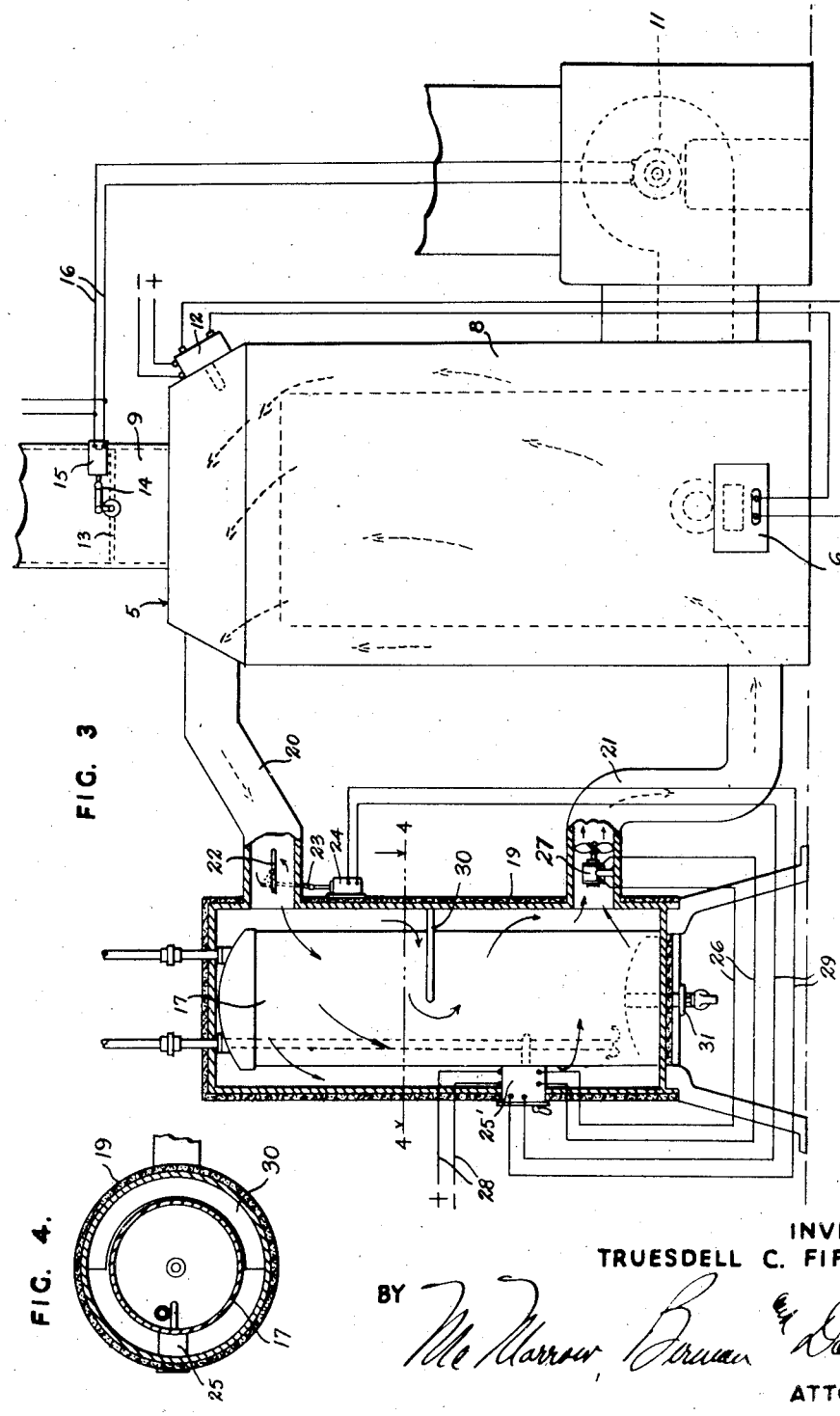
INVENTOR
TRUESDELL C. FIFE
BY
ATTORNEYS Patented Dec. 14, 1948

2,455,988

UNITED STATES PATENT OFFICE 2,455,988

WATER HEATER

Truesdell C. Fife, Reading, Mass.

Application December 14, 1945, Serial No. 634,944

2 Claims. (Cl. 237—2)

1

This instant invention relates to a water heater for household use and adapted for connection to a hot-air furnace equipped with automatic heat and preferably of the air conditioning type.

The main object of the invention is the provision of a water heater receiving hot air from and delivering cold air to the heat chamber of a hot-air furnace by thermal action and also subjected to forced circulation of such air if the temperature of the water is below a predetermined degree.

Another object of the invention is the provision of a water heater of the class characterized, forming an annular chamber heated from the outside and inside.

Still another object of the invention is the provision of a hot-air water heater which heats the water by thermal action controlled by an aquastat and by forced circulation at a temperature different from the temperature for the thermal action.

Other and further features and objects of the invention will be more apparent to those skilled in the art upon a consideration of the accompanying drawings and following specifications, wherein are disclosed two exemplary embodiments of the invention.

In said drawings:

Figure 3 is a view similar to Figure 1 and showing a modification;

Figure 4 is a detail section on line 4—4 of Figure 3.

Figures 1, 2:
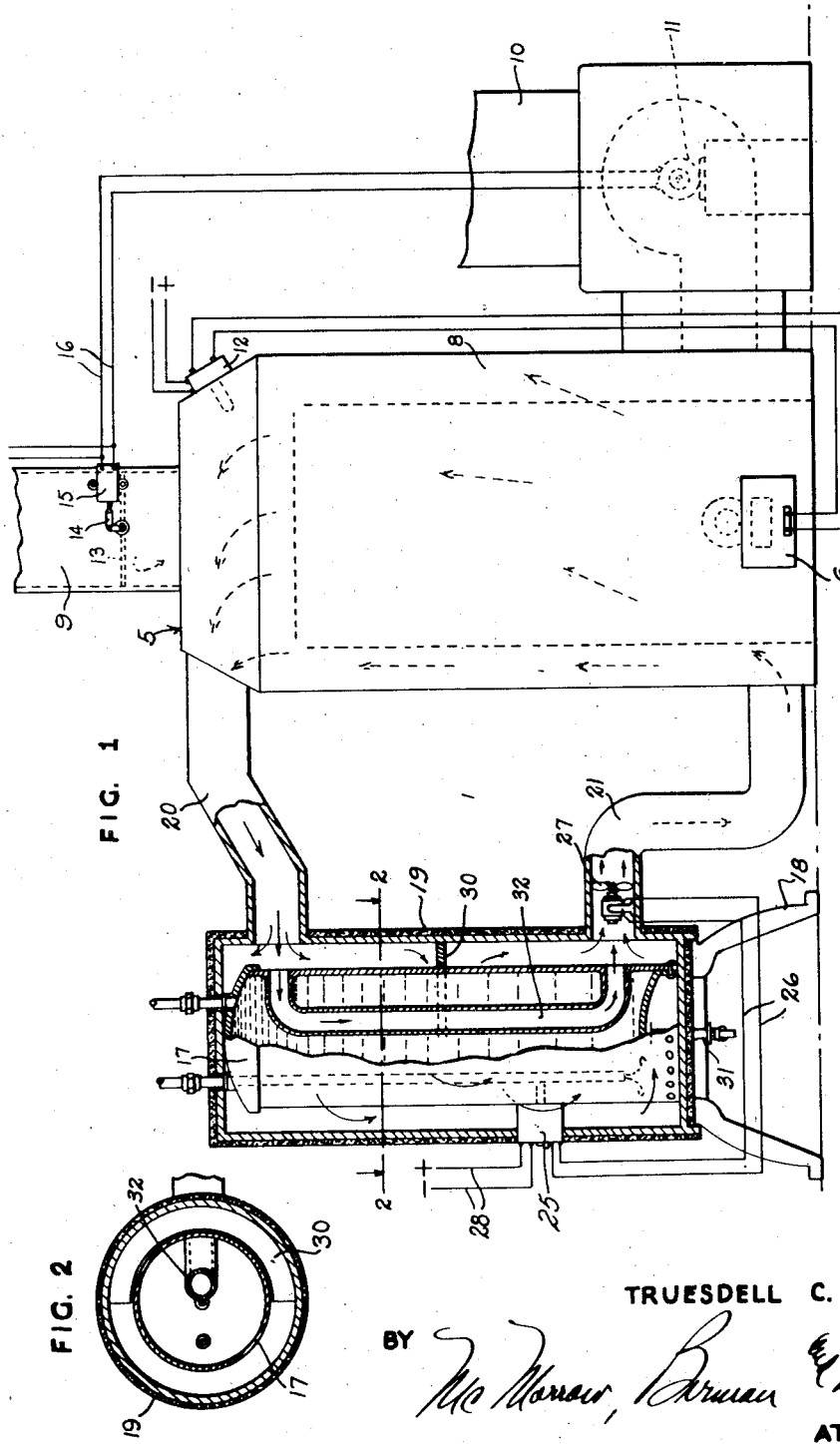
Figure 1 is a front elevation of a furnace and sectional elevation of a casing connected to the furnace and enclosing a water heater which is partly shown in vertical section.
Figure 2 is a horizontal detail section on line 2—2 of Figure 1.

Referring in detail to the drawing, numeral 5 denotes the hot-air furnace of a plant for heating a dwelling and the like, which plant may be of the air-conditioning type. An automatic heating means 6 is provided for the furnace and may take the form of a stoker or of an automatic gaseous fuel burner.

This automatic heating means is shown in a location adapting it for furnishing heat to a space between an outer casing and the furnace proper and referred to as the heat chamber 8. The same is connected at the upper end to a hot-air conduit 9 which leads to the area of the dwelling to be heated and hot-air registers controlling portions of such area.

The cold air return 10 is connected to registers in said area (not shown) and at its other end to

2 the lower part of the heat chamber. This end of the conduit 10 also houses a blower or suction fan 11 whereby the cold air of the area to be heated is drawn into the chamber 8. The fan or blower 11 is driven by an electric motor. A furnace thermostat 12 is controlled by the heat of the upper portion of chamber 8 and controls by an electrical connection the automatic heating means 6 described.

The adjustment of the furnace thermostat is such as to maintain a predetermined temperature of air within the heat chamber 8 by the automatic control of the heating means 6.

The movement of the heated air from the heat chamber 8 and through the conduit 9 is controlled by a damper type valve 13 which is connected by linkage 14 to a conventional electrical control means 15 which may take the form of a solenoid mounted in a casing attached to the outside of the conduit 9. The electrical control means 15 is connected in an electric circuit 16 of a thermostat (not shown) and located in the area served by the warm and cold air registers described. The circuit 16 includes a branch supplying current to the motor driving the blower so that a lowering of the temperature in the area of the dwelling referred to, to a predetermined value, opens the damper 13 and starts the fan 11.

An air conditioning apparatus (not shown) may be associated with the air return 10 so that only reconditioned air enters the heat chamber 8. The heating system disclosed is distinguished from the conventional system by the provision of a furnace thermostat 12 for substantially maintaining the temperature of the heat chamber by starting the heating means 6 as soon as such temperature drops to a predetermined degree.

The instant invention, in addition to combining the furnace thermostat 12 and damped type valve 13 and its temperature-controlled operating means 15, includes a water tank 17 of any desired capacity and connected to the water system of the dwelling in a usual way. This tank has for a support the stand 18 located adjacent to the furnace and which also supports a casing 19 which encloses the tank on all sides and defines with the tank a generally annular space serving as a passage for the hot air.

The same is supplied by a conduit 20 connected to the casing near the upper end thereof and at the other end to the upper part of the heat chamber, while the conduit 21 connects the lower part of the annular space and heat chamber. Thus the air circulates by thermal action.

The casing 19 carries an aquastat 25 connected with the interior of the water tank 17 and controlling an electric circuit 26 of a motor in driving a fan or blower 27 in the conduit 21. Conductors 28 connect the aquastat to a source of current. The function of the blower 27 is to suck the hot air into the space surrounding the water tank which space is connected at both ends to a branch conduit 32 which passes through the tank. Additional branch conduits may be provided if desired.

A semi-annular baffle 30 may be arranged within the casing 19 and around the right-hand half of the tank and will deflect the hot air entering at the top to flow through the left-hand half of the annular space around the tank. This arrangement results therefore, in a quickening and equalizing of the water heating process. This result is also achieved by the provision of the channel 32 which connects with the annular air space surrounding the tank and opens directly oppositely to the conduits 20 and 21, and extends through the tank, the water in the same being heated from the outside and from within the tank.

A drain pipe 31 is controlled by a valve and connects with the bottom of the tank 17 and centers the same on the stand 18 by extending therethrough.

When the temperature of the water in the tank drops to or below a predetermined degree owing to the use of the heated water and inflow of cold water or other causes, the aquastat 25 starts the motor of the blower which causes hot air to flow into the space surrounding the tank and relatively cold air to flow to the heat chamber to be reheated. This circulation continues after the temperature in the water has reached the predetermined degree and the blower has stopped. The conduit within the water tank causes the water to get heated more quickly and in a more uniform manner.

The modified form of my invention illustrated in Figures 3–4 has many features in common with the preferred embodiment as indicated by like numerals which indicate like or similar parts. The water tank however, lacks the internal hot air circuit 32.

Hot air may circulate from the heat chamber through conduit 20, the annular space within casing 19, conduit 21 back to the heat chamber by thermal action, but only when the damper type valve 22 is open. The same is connected through linkage 23 to an electrical operating means 24 which may take the form of a solenoid or magnet (not shown) enclosed in a case mounted on the right-hand side of casing 19. The operating means 24 is connected by conductors 29 to a double acting aquastat 25' carried on the opposite side of the casing. The aquastat is connected with the interior of the tank and controls also the blower 27.

This double action aquastat is manufactured by the Minneapolis Honeywell Corporation and owes its name to the fact that it is adjustable for control of two circuits at different temperatures. Thus the blower is controlled by the aquastat at a temperature different from the temperature at which the damper valve is controlled.

The water heating plant of Figures 3, 4 is in operation throughout the year just like the furnace. The aquastat may be so set that the blower operates only below a certain water temperature while the damper valve is open above such temperature and closes at a higher temperature.

It is apparent that I have provided means for furnishing heat and hot water at any time, each in accordance with the demand, that is, the means for furnishing hot water may be operated without or at the same time heat is being furnished. The plant heating apparatus is used winter and summer without changing the structure, and without a change of control means, and the system may be utilized in connection with gas burners, fluid fuel burners, coal stokers or even with the ordinary hand fire furnace equipped with draft controls.

It is apparent that modifications of my invention may be made by those skilled in the art without departing from the spirit and scope of my invention as set forth in the appended claims.

I claim:

1. In a hot air heating furnace including heating means and a chamber for air heated thereby, means for heating water, comprising a water tank located remotely from said furnace, a casing inclosing said tank and spaced therefrom to provide an air space therearound, a hot air inlet conduit connecting said chamber and casing and opening into said air space of said casing adjacent one end thereof, a cool air outlet conduit connecting said chamber and said casing and opening out of said air space of said casing adjacent an opposite end thereof, power means for circulating heated air through said chamber, conduits and casing, baffle means in the air space of said casing intermediate said conduits, and at least one flue through said tank, said flue opening into said air space at points adjacent to and in facing relation to said conduit openings.

2. In a hot air furnace including heating means and a chamber for air heated thereby, means for heating water, comprising a water tank located remotely from said furnace, a casing inclosing said tank and spaced therefrom to provide an air space therearound, a hot air inlet conduit connecting said chamber and casing and opening into said air space of said casing adjacent one end thereof, a cool air outlet conduit connecting said chamber and said casing and opening out of said air space of said casing adjacent an opposite end thereof, power means for circulating heated air through said chamber, conduits and casing, and at least one flue through said tank, said flue opening into said air space at points adjacent to and in facing relation to said conduit openings.

TRUESDELL C. FIFE.

REFERENCES CITED

The following references are of record in the file of this patent:

UNITED STATES PATENTS

| Number | Name | Date |
|---|---|---|
| 1,077,160 | Reese | Oct. 28, 1913 |
| 1,633,759 | Breese | June 28, 1927 |
| 1,988,263 | Casserly | Jan. 15, 1935 |
| 2,199,183 | Lippincott | Apr. 30, 1940 |
| 2,314,086 | Giffords | Mar. 16, 1943 |
| 2,331,907 | Harrington | Oct. 19, 1943 |
| 2,434,267 | Gorman | Jan. 13, 1948 |